G. H. JOHNSON.
CLEVIS.
APPLICATION FILED JAN. 26, 1910.
958,645.
Patented May 17, 1910.
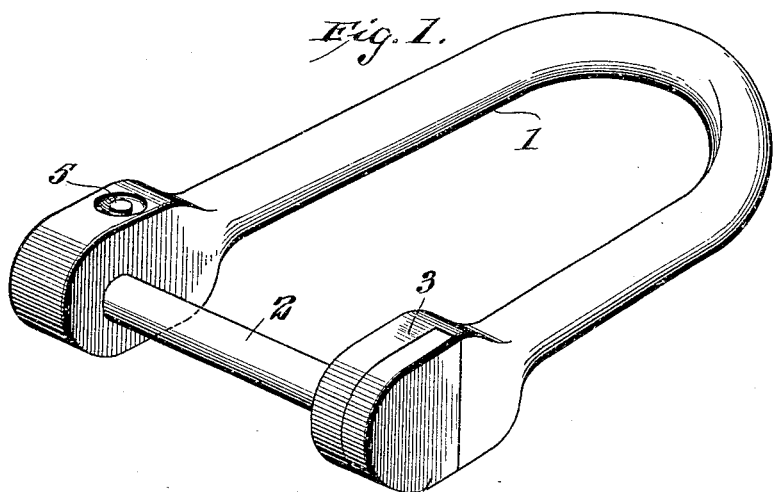
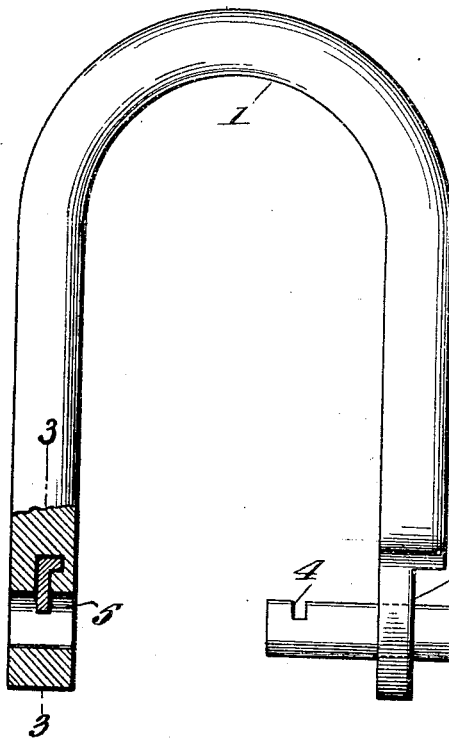
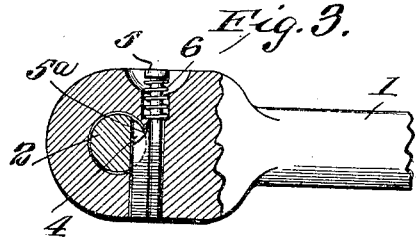
WITNESSES:
E. M. Callaghan
Amos W. Hart
INVENTOR
GUSTAF H. JOHNSON
BY Munn & Co.
ATTORNEYS

UNITED STATES PATENT OFFICE.

GUSTAF HERMAN JOHNSON, OF CIMARRON, TERRITORY OF NEW MEXICO.

CLEVIS.

958,645.      Specification of Letters Patent.      Patented May 17, 1910.

Application filed January 26, 1910. Serial No. 540,125.

*To all whom it may concern:*

Be it known that I, GUSTAF H. JOHNSON, a citizen of the United States, and a resident of Cimarron, in the county of Colfax and Territory of New Mexico, have invented certain Improvements in Clevises, of which the following is a specification.

My invention is an improvement in the construction of the ordinary U-shaped clevis used on plows, cultivators, and harrows for the attachment of draft appliances.

The novelty is embodied in two features as hereinafter described, whereby certain advantages are attained.

In the accompanying drawing:—Figure 1 is a perspective view of the invention. Fig. 2 is mainly a plan view, a portion being broken away to show interior construction. Fig. 3 is a section on the line 3—3 of Fig. 2.

The U-shaped body 1 of the clevis is provided at its ends with transverse holes to receive the bolt 2. The head $2^a$ of the latter is flat on one side, which abuts a corresponding shoulder 3 on the clevis, so that, when the bolt is inserted in place, it is prevented from rotating. The other end of the bolt has a transverse groove, or open slot, 4, as shown in Fig. 2, which groove receives a fastening device 5, when the bolt is in place, as shown in Figs. 1 and 3. The said fastening device is in the nature of a sliding bar having one end broadened so as to provide a cam-like projection $5^a$. It is arranged in a slot formed in the clevis adjacent to and communicating with the opening which receives the grooved end of the bolt. Its round shank is encircled by a spiral spring 6, which bears upward against the head of the device, as shown in Fig. 3, the lower end of the spring being seated on a shoulder at the lower end of the socket in which the spring rests. It will now be understood that, when the bolt is inserted in place, as shown in Figs. 1, 3, the broadened portion $5^a$ of the fastening device enters or engages the groove 4 in the bolt, as shown in Fig. 3, whereby the bolt is held securely in place. The fastening device is obviously held in such position by the tension of the spring. If it be desired to release the bolt, pressure is applied to the head of the device, whereby the spring is compressed and the cam-like portion of the device is forced down out of the groove in the bolt and below the body of the same, which leaves the bolt free to slide.

The aforesaid shoulder 3 of the clevis which the head $2^a$ of the bolt abuts when in place, is sloped on the side nearest the body of the clevis, and the head of the bolt is flush with the same, as plainly shown in Fig. 2. By this construction, the head of the bolt is prevented from contact with other objects, which is very objectionable in clevises of the ordinary construction. The engagement of the shoulder with the head of the bolt likewise prevents its rotation, so that the groove in the bolt is always held in position for engagement with the fastening device. By use of the latter, I dispense with the thread and nut ordinarily employed as a means for securing the bolt detachably to the clevis, and, the bolt being made shorter, its end is flush with the side of the clevis so that a smooth surface is presented at that point, which is a very desirable feature.

In order to protect the head of the fastening device from contact with other objects, it may be arranged in a socket, so that, when in locking position, as shown in Figs. 1, 3, the head does not project above the clevis.

What I claim is:—

1. The improved U-shaped clevis having one of its legs provided with a shoulder and the other with a transverse slot, a bolt having a head adapted to engage said shoulder and its other end provided with a groove, and a fastening device mounted in said slot and adapted to engage the groove for holding the bolt detachably, substantially as described.

2. A clevis comprising a U-shaped body having one of its apertured ends provided with a transverse slot, a bolt having a transverse groove adapted, when the bolt is in place, to register with the said slot in the body, and a fastening device consisting of a slidable cam-shaped bar arranged in said slot and a spring encircling the shank of the device, whereby the latter is held normally locked with the bolt, but may be released therefrom by pressure applied to its head, substantially as described.

GUSTAF HERMAN JOHNSON.

Witnesses:
ANNA EGNELL.
C. J. LODGE.